(12) United States Patent
Huang et al.

(10) Patent No.: US 8,056,630 B2
(45) Date of Patent: *Nov. 15, 2011

(54) METHODS OF USING VISCOELASTIC SURFACTANT GELLED FLUIDS TO PRE-SATURATE UNDERGROUND FORMATIONS

(75) Inventors: Tianping Huang, Spring, TX (US);
James B. Crews, Willis, TX (US); John Robert Willingham, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/435,908

(22) Filed: May 5, 2009

(65) Prior Publication Data

US 2009/0272534 A1      Nov. 5, 2009

Related U.S. Application Data

(63) Continuation-in-part of application No. 11/689,203, filed on Mar. 21, 2007, now Pat. No. 7,527,102, and a continuation-in-part of application No. 11/697,954, filed on Apr. 9, 2007, now Pat. No. 7,875,575.

(51) Int. Cl.
*E21B 43/27* (2006.01)
*E21B 33/13* (2006.01)
*C09K 8/584* (2006.01)

(52) U.S. Cl. ........ 166/281; 166/279; 166/293; 166/300; 166/305.1; 166/307

(58) Field of Classification Search ................ None
See application file for complete search history.

(56) References Cited

U.S. PATENT DOCUMENTS 5,964,295 A   10/1999  Brown et al.
6,667,280 B2  12/2003  Chang et al.
(Continued)

FOREIGN PATENT DOCUMENTS

WO    2008091956 A2    7/2008
(Continued)

OTHER PUBLICATIONS

E. Ali et al., "Effective Gas Shutoff Treatments in a Fractured Carbonate Field in Oman," SPE 102244, pp. 1-12, 2006 SPE Annual Technical Conference & Exhibition, Sep. 24-27, 2006.

(Continued)

*Primary Examiner* — Zakiya W Bates
(74) *Attorney, Agent, or Firm* — Mossman Kumar & Tyler PC

(57) ABSTRACT

Viscoelastic surfactant (VES) based fluid systems are effective to pre-saturate high permeability subterranean formations prior to a treatment operation that would undesirably suffer from high fluid leakoff. The fluid systems may include brine, a viscosity enhancer, as well as the VES, and a high temperature stabilizer. The stabilizer may be an alkaline earth metal oxide, alkaline earth metal hydroxide, alkali metal oxide, alkali metal hydroxide, $Al_2O_3$, and mixtures thereof. The viscosity enhancer may include pyroelectric particles, piezoelectric particles, and mixtures thereof. The fluid system is easy to pump into the formation, and after initial pumping, the fluid system will soak into and occupy or "pre-saturate" the pores of the formation prior to pumping of a second treating fluid for fracturing, gravel packing, frac-packing, and the like. The methods are practiced in the absence of acids typically used in acidizing operations, such as hydrochloric acid and hydrofluoric acid.

21 Claims, 5 Drawing Sheets

U.S. PATENT DOCUMENTS

| | | |
|---|---|---|
| 6,903,054 B2 | 6/2005 | Fu et al. |
| 7,008,908 B2 | 3/2006 | Chan et al. |
| 7,081,439 B2 * | 7/2006 | Sullivan et al. ............... 507/269 |
| 7,265,079 B2 * | 9/2007 | Willberg et al. .............. 507/203 |
| 7,347,266 B2 | 3/2008 | Crews et al. |
| 2002/0076803 A1 * | 6/2002 | Crews ........................... 435/266 |
| 2005/0067165 A1 | 3/2005 | Cawiezel et al. |
| 2006/0041028 A1 | 2/2006 | Crews |
| 2006/0211775 A1 | 9/2006 | Crews |
| 2006/0211776 A1 | 9/2006 | Crews |
| 2007/0151726 A1 | 7/2007 | Crews et al. |
| 2007/0299142 A1 * | 12/2007 | Crews et al. .................. 516/135 |
| 2008/0153720 A1 | 6/2008 | Huang et al. |
| 2008/0271888 A1 | 11/2008 | Huang et al. |

FOREIGN PATENT DOCUMENTS

| | | |
|---|---|---|
| WO | 2008096165 A1 | 8/2008 |

OTHER PUBLICATIONS

H.A. Nasr-El-Din, "Lessons Learned and Guidelines for Matrix Acidizing With Viscoelastic Surfactant Diversion in Carbonate Formations," SPE 102468, pp. 1-11, 2006 SPE Annual Technical Conference and Exhibition, Sep. 24-27, 2006.

H.A. Nasr-El-Din, "Acid Fracturing of Deep Gas Wells Using a Surfactant-Based Acid: Long-Term Effects on Gas Production Rate," SPE 102469, pp. 1-12, 2006 SPE Annual Technical Conference and Exhibition, Sep. 24-27, 2006.

* cited by examiner

METHODS OF USING VISCOELASTIC SURFACTANT GELLED FLUIDS TO PRE-SATURATE UNDERGROUND FORMATIONS

CROSS-REFERENCE TO RELATED APPLICATION

This application is a continuation-in-part application of U.S. patent application Ser. No. 11/689,203 filed Mar. 21, 2007, issued as U.S. Pat. No. 7,527,102 on May 5, 2009, and is a continuation-in-part application of U.S. patent application Ser. No. 11/697,954 filed Apr. 9, 2007, issued as U.S. Pat. No. 7,875,575 on Jan. 25, 2011.

TECHNICAL FIELD

The present invention relates to methods and compositions to pre-saturate a high permeability subterranean formation, and more particularly relates, in one embodiment, to methods of using VES-gelled aqueous fluids containing temperature stabilizers and viscosity enhancers to inhabit and occupy the pores of a high permeability subterranean formation prior to a hydrocarbon recovery operation that would suffer from fluid leakoff.

TECHNICAL BACKGROUND

In the fracturing of subterranean formations for the production of hydrocarbons, it is common to produce fractures in the formation by pumping a fluid at a relatively high pressure into the formation through a wellbore whereby the formation fracturing pressure gradient is exceeded and fractures propagate from the wellbore into the formation. Nearly any fluid given enough volume and pressure can be used to fracture a subterranean formation. However, fracturing fluids, generally include a viscosifying or gelling agent such as a crosslinked or un-crosslinked polysaccharide material, or a viscoelastic surfactant, to affect the rheology by increasing viscosity and increase the proppant-carrying capability of the fluid.

Using stimulation operations such as fracturing, gravel packing, frac-packing, and combinations thereof in high-permeability formations, that is formations having a permeability greater than 100 millidarcy (>100 md; >$10^{-9}$ cm$^2$) has generated considerable interest in recent years. Attempts have been made to utilize hydroxyethylcellulose (HEC) as a viscosifier in the fracturing fluids for such formations. Unfortunately, HEC and most other polymer gels exhibit high rates of leak off to the formation because they may not build up a satisfactory filter cake with acceptable volumes of lost fluid at permeabilities >100 md (>$10^{-9}$ cm$^2$). This results in large volumes of fluid being required for each formation treatment. The high fluid loss also makes it very difficult to create a fracture having the desired geometry to maximize hydrocarbon production because the fluid is leaking off into the pores instead of pushing against the rock.

Methods are known for fracturing relatively high permeability subterranean formations (above about 10 md (above about $10^{-10}$ cm$^2$) using a fracturing fluid system employing two polymer-gelled fluids. An aqueous fracturing fluid is prepared including a viscosifying agent, such as a borate crosslinked hydroxypropyl guar gel. The crosslinked gel is introduced into a subterranean formation through a wellbore at a rate and pressure sufficient to result in initiation of a fracture in the formation and development of a filter cake to control fluid-loss. The first fluid also may include a quantity of proppant. A second fracturing fluid also is prepared. The second fluid comprises a viscosifying agent and may or may not include a crosslinking agent for the viscosifying agent; preferably not. A proppant is added to the second gel and the fluid is introduced into the formation and into the fracture created by the first fluid. The second fluid functions to carry and transport the proppant into the created fracture and, more importantly, to induce a break of the filter cake formed from the first fluid. The second fluid causes an increase in the leak-off rate of the fluid through the fracture faces which improves the ability of the proppant to pack within the fracture by dehydration of the fracturing fluid. Unfortunately, the use of even one polysaccharide-containing fluid tends to cause formation damage when the filter cake formed is removed. Using two polysaccharide-containing fluid increases this risk.

It would be desirable to provide a method by which a high permeability formation could be successfully stimulated while minimizing the potential for formation and proppant bed damage. This method should still reduce or eliminate the tendency of the fluid to leak off into the high permeability formation to make the overall treatment method more efficient and less wasteful.

SUMMARY

There is provided, in one form, a method for pre-saturating a high permeability subterranean formation that involves injecting into a wellbore in or penetrating a subterranean formation having a permeability of at least 100 millidarcies (md) ($10^{-9}$ cm$^2$) an aqueous viscoelastic treating fluid. The aqueous viscoelastic treating fluid contains brine, at least one viscoelastic surfactant in an amount effective to increase the viscosity of the aqueous viscoelastic treating fluid, at least one viscosity enhancer and at least one high temperature stabilizer, and at least one internal breaker. The viscosity enhancer may include pyroelectric particles and/or piezoelectric particles. The aqueous viscoelastic treating fluid is pumped against the high permeability subterranean formation, which pumping may occur simultaneously with injecting the aqueous viscoelastic treating fluid into the wellbore. Pumping the aqueous viscoelastic treating fluid against the high permeability subterranean formation is stopped to permit the aqueous viscoelastic treating fluid to be at least partially absorbed into pores of the high permeability subterranean formation. This period or pause is for a relatively short period, in one non-limiting embodiment, between about 5 and about 30 minutes. A second treating fluid is subsequently or later injected into the wellbore for a treatment operation, such as fracturing, gravel packing, frac-packing, and combinations thereof.

DETAILED DESCRIPTION

Figure 1:
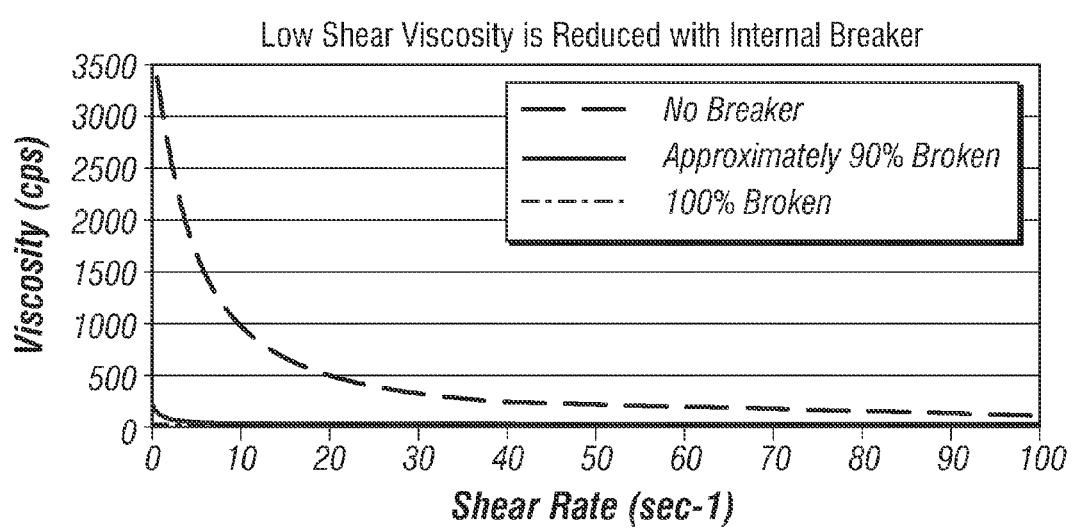
FIG. 1 is a graph of viscosity as a function of shear rate for a fluid with and without an internal breaker, demonstrating that viscosity may be greatly reduced with an internal breaker herein.

It has been discovered that methods and compositions for well completion and stimulation using viscoelastic surfactant (VES) gelled fluids may be used to pre-saturate high permeability underground formations at the near wellbore region (up to 20 feet (about 6 meters) away from wellbore) to reduce fluid loss for a subsequent well service or stimulation treatment fluid. By "saturated" is meant that all or substantially all of the pore volume of the porous media (the hydrocarbon reservoir or formation) is occupied by the VES-gelled fluid. By "pre" is meant that this occupation of the pores is performed with an initial treatment of the VES, after which a second treating fluid provides greater energy and force. The VES fluids are at least partially absorbed into the pores in the near wellbore region. It is acceptable if substantially all (at least 90 vol %) of the VES is absorbed into the pores. These VES fluids for pre-saturation include brine, a VES to increase the viscosity of the fluid, at least one stabilizer, particularly for high temperature applications and environments, at least one viscosity enhancer, and at least one internal breaker to subsequently reduce the viscosity of the aqueous viscoelastic treating fluid.

The aqueous viscoelastic treating fluid herein may be pumped into the near wellbore portion (up to 20 feet (about 6 m) away from wellbore) of the formation first. Pumping may be stopped for awhile, in a non-limiting instance from about 5 to about 30 minutes, and then subsequent and continued pumping of a second fluid, such as a completion or stimulation treatment fluid for operations such fracturing, gravel packing, frac-packing, and combinations thereof may be begun. The second or subsequent fluid may be gelled with a polymer and/or a VES, and may contain proppant and/or other components, as is well known in the art. Since this VES fluid system has a very high static viscosity and a low shear rate viscosity in the near wellbore portion of the formation, the fluid loss for the subsequent, following well service fluid or stimulation fluid will be significantly reduced. The pre-saturation VES fluids will also help to initiate fractures for frac-pack and fracturing treatment of high permeability reservoirs. After well completion or stimulation treatments are completed, the internal breakers in the VES fluid system will break the fluid and dramatically reduce the viscosity of the VES fluid. The internally broken VES fluid will easily flow back with the producing fluid, generating little or no formation damage.

In one non-limiting embodiment, the pre-saturating method is practiced in the absence of acidizing, matrix acidizing, fracture acidizing, and similar procedures. In an alternative or additional non-restrictive feature, the pre-saturating method is practiced in the absence of an acid; in one non-limiting embodiment, in the absence acids typically used in such procedures, including, but not necessarily limited to, acetic acid, formic acid, glutaric acid, succinic acid, adipic acid, phosphoric acid, hydrochloric acid, hydrofluoric acid and/or fluoroboric acid.

The mean particle sizes of the high temperature stabilizer and the viscosity enhancer may be less than about 1000 nanometers to ensure that the particles may easily flow in and out of a typical hydrocarbon producing (oil and natural gas) formation. In one non-restrictive embodiment, the mean particle size of these particles is less than about 100 nm.

The temperature stabilizer may be crystal particles which are alkaline earth metal oxides, alkaline earth metal hydroxides, alkali metal oxides, alkali metal hydroxides, $Al_2O_3$, $ZnO$, and mixtures thereof, such as $MgO$, $TiO_2$, $Al_2O_3$, and the like. The viscosity enhancer may be pyroelectric particles, piezoelectric particles, and mixtures thereof, in one non-limiting embodiment. In some cases there are viscosity enhancers that may perform also as high temperature stabilizers: that is, act toward enhancing VES viscosity at lower temperature (such as at 150° F. (66° C.)), but may act toward improving viscosity stability (i.e. thermal stability of the VES micelles) at higher temperatures (such as at 250° F. (121° C.) and above). An example is ZnO which may function both as a viscosity enhancer at low temperature and as stabilizer at relatively high temperature.

In one non-limiting embodiment, for environments under about 180° F. (82° C.) less of a high temperature viscosity stabilizer may be required or useful for the methods herein. The term "stabilizer" herein is a component that helps or enables the VES fluid viscosity remain stable at fluid temperatures at or greater than about 170° F. (77° C.), alternatively at or greater than about 180° F. (82° C.).

Previously, in high permeability formations, such as those of 1000 md ($10^{-8}$ $cm^2$) or more, the formation cannot be properly or easily fractured in frac-packing treatments using conventional fracturing fluids because of high fluid leakoff—that is, the fluid readily flows into the highly permeable porous media. The inventive fluid system may be pumped into the target zone at a pressure less than formation fracture pressure, and after pumping is stopped, the aqueous viscoelastic treating fluid will "pre-saturate" the near wellbore region of the porous media of underground formation, that is, soak into and occupy or inhabit the pores in this region. The VES-gelled fluid has a very high viscosity at low shear rates and will form or build a temporary viscous "wall" or "barrier" to help the subsequent fracturing fluid to build up enough pressure to crack the formation. At the same time, fluid leakoff is reduced. Since the viscous wall or barrier occurs in situ, better control on the placement of the fluid is achieved and deeper penetration of the VES fluid may be accomplished with all or most of the effective permeability of the target zone "pre-saturated" or the pores therein filled by the aqueous viscoelastic treating fluid. For high permeability or naturally fractured active zones, the aqueous viscoelastic treating fluid herein will plug or occupy the flow channels with the very viscous fluid during the period after pumping is stopped. Once pumping is resumed, the aqueous VES fluid barrier will move forward and form a front or leading wall ahead of the second treating fluid, causing the formation to fracture while also inhibiting, preventing or stopping unwanted fluid leakoff into the high permeability portions of the formation. After the fracturing (and/or other) treatment, the internal breakers in the VES break down and reduce the viscosity of the VES fluid so that it may be easily flowed back from the wellbore prior to the production of hydrocarbons, leaving little or no formation damage.

The VES system has very low viscosity at high shear rates, which means it is easy to pump, and has very high viscosity at low shear rates, which means that after pumping is stopped, the fluid plug at the near wellbore region of the formation prevents, inhibits, retards or stops unwanted leakoff. Without wishing to be limited to any particular parameter range, it is expected that in one non-restrictive embodiment of the invention, the gel strength of the gels formed will range from about 500 to about 35,000 cP, preferably from about 1000 to about 20,000 cP. The first stage treatment may be pumped into targeted formations to provide fluid loss control on subsequent water based fluids.

It will be appreciated that although the methods and compositions herein have been spoken of in some cases as being able to completely prevent fluid loss into subterranean formations during the described operations, that the inventive methods and compositions are considered successful even if less than complete leak off prevention is accomplished. Inhibition, reduction, diminishing, decreasing, and lessening of the fluid leaking off into the formation through the use of barriers, "walls" or plugs herein are all considered successful, as are the complete prevention, cessation, stoppage, end and termination of undesired flow, that is, complete control of the fluid leaking off into the high permeability formation.

Magnesium oxide particles and powders have been used as temperature stabilizers for VES-gelled aqueous fluids at temperatures from about 180 to about 300° F. (about 82 to about 149° C.) as disclosed in U.S. Pat. No. 7,343,972, incorporated herein in its entirety by reference. It will be appreciated that although MgO particles are noted throughout the application herein as one representative or preferred type of stabilizer, other alkaline earth metal oxides and/or alkaline earth metal hydroxides, alkali metal oxides, alkali metal hydroxides, $Al_2O_3$, ZnO, $TiO_2$, and mixtures thereof may be used in the methods and compositions herein. Additionally, the alkali metal hydroxides and alkali metal oxides may be used alone or in combination with the alkaline earth metal oxides and hydroxides.

The alkali metal hydroxide NaOH has been found to improve the thermal stability of VES fluids. The alkali metal hydroxide additives LiOH, NaOH, and KOH readily dissolve in water and will travel wherever the VES fluid flows during a treatment, and therefore will be easily removed from the reservoir with the VES fluid and may not induce particulate pore plugging type formation damage.

It was discovered that by using very small MgO particles, such as nanometer-sized particles, the particles would stay within the VES that flows into the subterranean formation during a treatment. These MgO nano-particles, may be used to stabilize VES-gelled aqueous fluids in place of (or in addition to) larger sized MgO particles for fluid loss control treatments.

This use of nanometer-sized particles is an improvement over the previous VES-gelled fluid stabilizing chemistry. Some nano-sized particles have a mean particle size of 30 nanometers (nm). One nano-MgO product was shown in laboratory tests to pass through the Berea test cores with no plating or accumulation of MgO particles on the core faces, which means nano particles are easy to flow into the porous media to stabilize the viscosity of the VES fluid. Viscosity stability tests show both particle types may achieve thermal stability of the VES-micelles at 250° F. (121° C.) over time.

The nano-sized MgO particles are also suspected of having additional chemistry useful for VES thermal stability. Without being limited to any one particular theory, it is suspected that some nano-sized MgO particles have unique particle surface charges that use charge attraction, surface adsorption and/or other chemistries to associate, relate or join the VES micelles. As is known, viscoelastic surfactants increase the viscosity of the aqueous fluids in which they reside by forming elongated or "worm-like" micelles that become physically entangled. This technical improvement is helpful in the field when applying the MgO stabilizer technology, to assure VES-gelled fluid stability.

The stabilizing solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like. In the case of the alkali metal oxides and alkali metal hydroxides, the alkali metal includes, but is not necessarily limited to, lithium, potassium, sodium and mixtures thereof.

The amount of nano-sized stabilizer particles in the VES-gelled aqueous fluid may range from about 0.5 to about 20.0 pptg (about 0.06 to about 2.4 kg/1000 liters) or even up to about 40.0 pptg (about 4.8 kg/1000 liters). Alternatively, the lower threshold of the proportion range may be about 1.0 pptg (about 0.12 kg/1000 liters), while the upper threshold of proportion of the particles may independently be about 10.0 pptg (about 1.2 kg/1000 liters) pptg.

It has been discovered that the addition of pyroelectric crystal and/or piezoelectric crystal particles to an aqueous VES fluid demonstrate improved, enhanced or increased viscosity of the VES fluid. The viscosity enhancers herein are believed to be particularly useful in VES-gelled fluids used for well completion or stimulation and other uses and applications where the viscosity of VES-gelled aqueous fluids may be increased, such as the fluid leakoff prevention methods herein. It is especially useful that the viscosity enhancer particles may be very small to flow with VES fluid into the formation.

In one non-limiting explanation or theory, high temperatures and/or pressures heat and/or squeeze or press the crystal particles thereby causing more electrical charges on their surfaces. The particles with surface charges associate, connect or link the VES micelles, thus further increasing their network and enhancing the viscosity of the fluid system. In particular, the VES-gelled aqueous fluids have improved (increased, enhanced or raised) viscosity over a broad range of temperatures, such as from about 70 (about 21° C.) to about 400° F. (about 204° C.); alternatively up to about 350° F. (about 177° C.), and in another non-limiting embodiment up to about 300° F. (about 149° C.). With respect to pressure, in another non-limiting embodiment, effective pressures may range from about 1000 psi (about 6.7 MPa) to about 40,000 psi (about 300 MPa). Alternatively, the lower end of the suitable pressure range may be about 100 psi (about 0.7 MPa), while the upper end may independently be about 50,000 psi (about 340 Pa). In another alternate embodiment, the lower end may be about 300 psi and the upper end may independently be about 40,000 psi (about 2.0 MPa to about 276 MPa).

The discovery of the benefit of piezoelectric and/or pyroelectric crystals allows the VES system to have improved fluid viscosity to enhance the ability of the VES fluid to inhibit, prevent or reduce the flow of fluid into a high permeability formation. Further, the introduction of these viscosity enhancers to the VES-gelled aqueous system will limit and reduce the amount of VES fluid which flows into the pores of a reservoir during a completion or stimulation treatment or other procedure. Enhancing the fluid viscosity of the VES-gelled fluids also helps reduce the amount of VES necessary to achieve a particular viscosity level. Thus the use of these viscosity enhancers in a VES-gelled aqueous system will improve the performance of the VES fluid while lowering treatment cost.

The viscosity enhancers useful herein include, but are not necessarily limited to, piezoelectric crystal particles, pyroelectric crystal particles, or mixtures thereof. Generally, pyroelectric crystals are also piezoelectric. Pyroelectric crystals generate electrical charges when heated and piezoelectric crystals generate electrical charges when squeezed, compressed or pressed.

In one non-limiting embodiment, specific viscosity enhancers may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$, potassium sodium tartrate, tourmaline, topaz and mixtures thereof. The total pyroelectric coefficient of ZnO is −9.4 $C/m^2K$. Zinc oxide and these and the other crystals are generally not water soluble.

In one non-limiting explanation, when the VES fluid mixed with very small pyroelectric crystals, such as nano-sized ZnO, is pumped downhole into underground formations that are under high temperature and/or high pressure, the pyroelectric crystals are heated and/or pressed and high surface charges are generated. These surface charges permit the crystal particles to associate, link, connect or otherwise relate the VES micelles together to increase fluid viscosity. The association or relation of the micelles is thought to be roughly analogous to the crosslinking of polymer molecules by crosslinkers. The high fluid viscosity is helpful and beneficial to reduce or stop the flow or leak off of treatment fluid into high permeability formation zones.

In another non-limiting embodiment, the viscosity enhancers herein do not include the suspension of colloidal particles employed in U.S. Pat. No. 7,081,439. More specifically, the viscosity enhancers herein do not include colloidal particles comprising a material selected from the group consisting of silica, aluminum oxide, antimony oxide, tin oxide, cerium oxide, yttrium oxide, zirconium oxide, or mica.

In one non-restrictive embodiment, the amount of viscosity enhancing additive ranges from about 0.1 to about 500 pounds per thousand gallons (pptg) (about 0.012 to about 60 $kg/m^3$) based on the aqueous viscoelastic treating fluid. In another non-restrictive embodiment, the amount of additive may have a lower limit of about 0.5 pptg (about 0.06 $kg/m^3$) and independently an upper limit of about 100 pptg (about 12 $kg/m^3$) or 200 pptg (about 24 $kg/m^3$), and in another non-restrictive version a lower limit of about 1 pptg (about 0.12 $kg/m^3$) and independently an upper limit of about 50 pptg (about 6 $kg/m^3$), and in still another non-limiting embodiment, a lower limit of about 2 pptg (about 0.2 $kg/m^3$) and independently an upper limit of about 20 pptg (about 2.4 $kg/m^3$).

In one non-limiting explanation, it appears that the viscosity enhancer pyroelectric and piezoelectric crystals may generate extra positive charges on the surface of the crystal particles. These positive charges will attract the anionic part in the micelle of VES-gelled fluids and form a strong network that increases fluid viscosity and plugs or occupies the pore throats of porous formations to reduce, slow or stop the flow of fluids therethrough. Another advantage for the pyroelectric and piezoelectric crystals being a good viscosity enhancer in VES-gelled fluids is that they are sufficiently small and may be easily flowed with VES fluid into the target formation.

In another non-limiting embodiment, the particle size of the stabilizer and/or viscosity enhancer additives and agents ranges between about 1 nanometer, independently up to about 100 nanometers. In another non-limiting embodiment, the particle size ranges between about 4 nanometers, independently up to about 80 nanometers. In another non-restrictive version, the particles may have a mean particle size of about 100 nm or less, alternatively about 50 nm or less, and in another possible version about 40 nm or less. In another non-limiting embodiment, the particle size of the viscosity enhancers ranges between about 1 nanometer independently up to about 2 microns.

Figure 4:
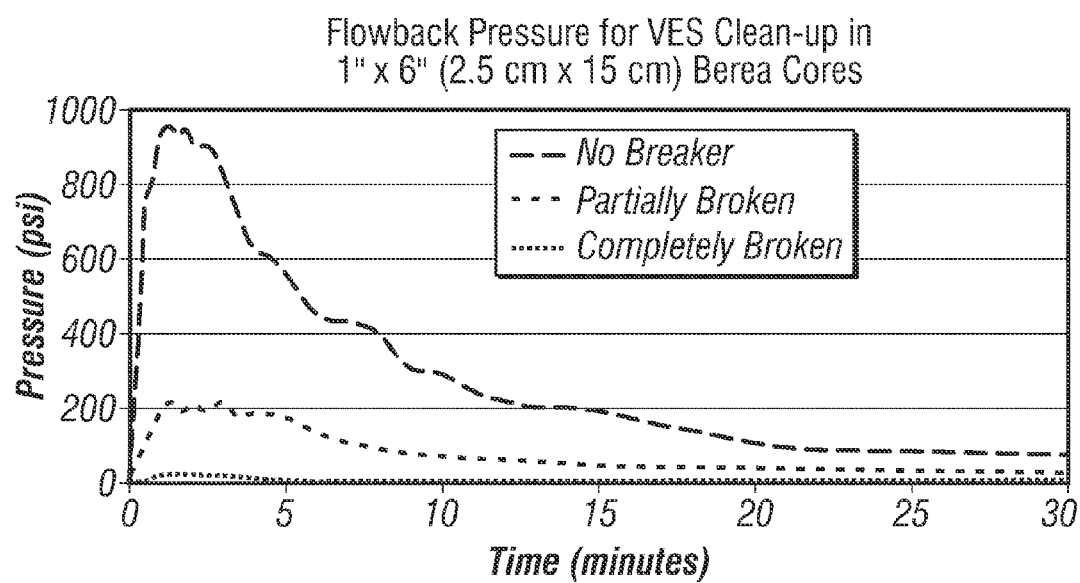
FIG. 4 is a graph of flowback pressure as a function of time through a 1"×6" (2.5×15 cm) Berea core for a fluid with no breaker, a partially broken fluid and a completely broken fluid.
Figure 5:
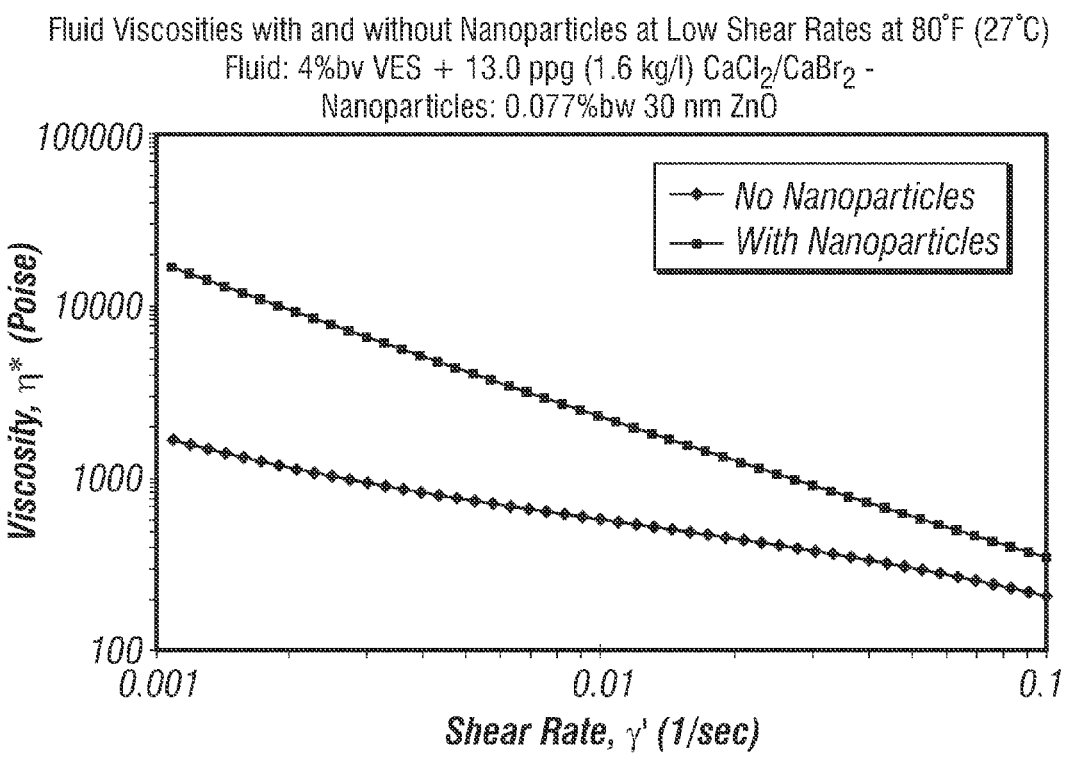
FIG. 5 is a graph of viscosity as a function of very low shear rate for a fluid with and without viscosity enhancer, showing that viscosity is significantly increased with a viscosity enhancer.

Internal breakers suitable for the methods and compositions herein include transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof. Internal breakers are defined as those contained within the aqueous viscoelastic treating fluid when it is introduced into the wellbore and formation as contrasted with external breakers added from outside the fluid to break it in a separate step after the VES-gelled fluid is injected into the wellbore. The internal breakers herein will allow controllable breaks over time, such as within 1 to about 288 hours. In another non-limiting embodiment the break for the aqueous viscoelastic treating fluids may occur within about 8 to about 144 hours; alternatively from about 12 to about 96 hours, and in another non-restrictive version about 24 to about 72 hours. The breaker components herein can be used as an internal breaker, e.g. added to the gel after batch mixing of a VES-gel treatment, or added on-the-fly after continuous mixing of a VES-gel treatment using a liquid additive metering system in one non-limiting embodiment, or the components may be used separately, if needed, as an external breaker solution to remove VES gelled fluids already placed downhole. Preferably the breaker components are used as internal breakers. The use of internal breakers herein will allow the VES fluid to have substantial static and low shear rate VES fluid viscosity when initially absorbed into the reservoir pores during pre-saturation of the near wellbore region, as shown in FIG. 5, but they will controllably, over time, reduce the viscosity of the very viscous VES fluid into brine water-like viscosity to become an easily producible treatment fluid, as shown in FIG. 1 and FIG. 4. Without an internal breaker, very viscous VES fluids may not be easily or not as completely removed from the absorbed pores of the formation, as shown in FIG. 4. Reliance on simple contact with reservoir hydrocarbons may not be effective since complete mixing or thorough contacting within the tiny pores of the reservoir may not occur and thus the absorbed VES fluid may be difficult to displace and poor cleanup of the absorbed VES fluid may well result if internal breakers are not employed. Prior VES fluids in the art that do not have internal breakers present therein may in many cases fail significantly in the rate and amount of VES fluid cleanup, and may leave substantial initial and long-term residual formation damage. Reliance on VES fluid cleanup using an external VES breaker solution can have limited distribution, coverage or contact with the vast amount of pre-saturated VES fluid absorbed into the near wellbore reservoir pores. This method of VES fluid use is ideally to be used with internal breaking agent, particularly with VES viscosity enhancers present.

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed macro- and/or microscopic oil droplets and thus form an oil-in-water type emulsion where the oil droplets are dispersed in the "internal phase" as a "discontinuous phase" of the brine medium/VES fluid which is the "outer phase" or "continuous phase". Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon activation, such as auto-oxidation of the fatty acids to products that disrupt the elongated, "rod-like" or "worm-like" micelles.

The methods described herein may employ one or more mineral oils (as a non-limiting example of a suitable breaker) as the breaking component. This is surprising because the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is influenced by type and amount of salts within the mix water (i.e. seawater, KCl, NaBr, $CaCl_2$, $CaBr_2$, $NH_4Cl$ and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker (e.g. mineral oil) used, the distillation range of the mineral oil, its kinematic viscosity, the presence of components such as aromatic hydrocarbons, and the like.

It may be important to add the lower molecular weight mineral oils after the VES product is added to the aqueous fluid. However, for higher molecular weight mineral oils, types like GLORIA® and HYDROBRITE® 200 from Crompton Corporation and PURE PERFORMANCE® Base Oils 225N and 600N from ConocoPhillips Company, they may be added before, during or after the VES product addition. Mineral oil (also known as liquid petrolatum) is a byproduct in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydro-treating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, base oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, BENOL®, CARNATION®, KAYDOL®, SEMTOL®, HYDROBRITE® and the like mineral oils available from Crompton Corporation, PURE PERFORMANCE® and ULTRA-S™ from ConocoPhillips Company, ESCAID®, EXXSOL®, ISOPAR® and the like mineral oils available from Exxon-Mobil Chemical, and similar products from other mineral oil manufacturers. The ESCAID 110® and ConocoPhillips LVT-200® mineral oils have been well known components of oil-based drilling muds and the oil industry has considerable experience with these products, thus making them attractive choices. The mineral oils from ConocoPhillips Company with their high purity and high volume use within other industries are also an attractive choice.

It has been discovered in breaking VES-gelled fluids prepared in monovalent brines (such as 3% KCl brine) that at temperatures below about 160° F. (71° C.) EXXSOL® D80 works well in breaking VES-gelled fluids, and that at or above about 140° F. (60° C.) PURE PERFORMANCE® 225N works well. The use of mineral oils herein is safe, simple and economical. In some cases for reservoir temperatures between about 120° to about 240° F. (about 49° to about 116° C.) a select ratio of two or more mineral oil products, such as 50 wt % ESCAID® 110 to 50 wt % HYDROBRITE® 200 may be used to achieve controlled, fast and complete break of a VES-gelled fluid.

It has also been discovered that type and amount of salt within the mix water used to prepare the VES fluid (such as 3 wt % KCl, 21 wt % $CaCl_2$, use of natural seawater, and so on) and/or the presence of a VES gel stabilizer (such as VES-STA 1 available from Baker Oil Tools) may affect the activity of a mineral oil in breaking a VES fluid at a given temperature. For example, ESCAID® 110 at 5.0 gptg will readily break the 3 wt % KCL based VES fluid at 100° F. (38° C.) over a 5 hour period. ESCAID® 110 also has utility as a breaker for a 10.0 ppg $CaCl_2$ (21 wt % $CaCl_2$) based VES fluid at 250° F. (121° C.) when a VES stabilizer (2.0 pptg VES-STA 1) is included. More information about using mineral oils, hydrogenated polyalphaolefin oils and saturated fatty acids as internal breakers may be found in U.S. Pat. No. 7,347,266, incorporated by reference herein in its entirety.

In one non-limiting embodiment these gel-breaking products or breakers work by rearrangement of the VES micelles from rod-shaped or worm-shaped elongated structures to give spherical structures. The breaking components described herein may also include the unsaturated fatty acid or polyenoic and monoenoic components of U.S. Patent Application Publication 2006/0211776, Ser. No. 11/373,044 filed Mar. 10, 2006, incorporated herein in its entirety by reference. In one non-restrictive version these unsaturated fatty acids (e.g. oleic, linoleic, linolenic, eicosapentaenoic, etc.) may possibly be used alone—in oils they are commonly found in (flax oil, soybean oil, etc), and can be provided as custom fatty acid blends (such as Fish Oil 18:12TG by Bioriginal Food & Science Corp.)—or used together with the mineral oils herein. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. In some cases it is preferred that the plant or fish oil be high in polyunsaturated fatty acids, such as flax oil, salmon oil, and the like. The plant and fish oils may be refined, blended and the like to have the desired polyunsaturated fatty acid composition modified for the compositions and methods herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction may be triggered or initiated by heat. These mineral, plant, and animal oils will slowly, upon heating, break or reduce the viscosity of the VES gel with the addition of or in the absence of any other viscosity reducing agent. The amount of internal breaker (mineral oil, e.g.), needed to break a VES-gelled fluid may in some cases be temperature dependent, with less needed as the fluid temperature increases. For mineral oil, the kinematic viscosity, molecular weight distribution, and amount of impurities (such as aromatics, olefins, and the like) also appear to influence the rate in which a mineral oil will break a VES-gelled fluid at a given temperature. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature, a degree of viscosity reheal may occur but in most cases no rehealing is expected. The effective amount of mineral oil, plant oil and/or fish oil ranges from about 0.1 to about 20 gptg based on the total fluid, in another non-limiting embodiment from a lower limit of about 0.5 gptg, where "total fluid" means overall VES gelled fluid with all components of the particular embodiment. Independently the upper limit of the range may be about 12 gptg based on the total fluid. (It will be appreciated that units of gallon per thousand gallons (gptg) are readily converted to SI units of the same value as, e.g. liters per thousand liters, $m^3/1000\,m^3$, etc.)

Controlled viscosity reduction rates can be achieved at a temperature of from about 60° F. to about 400° F. (about 16 to about 204° C.), and alternatively at a temperature of from about 80° F. independently to an upper end of the range of about 280° F. (about 27 to about 138° C.), and in another non-limiting embodiment independently up to about 300° F. (149° C.). In one non-limiting embodiment, the fluid designer would craft the fluid system in such a way that the VES gel would break at or near the formation temperature after the treatment fluid function was accomplished.

In one non-limiting embodiment, fluid internal breaker design would be based primarily on formation temperature, i.e. the temperature the fluid will be heated to naturally in the formation once the aqueous viscoelastic treating fluid has been pumped against the high permeability formation. Fluid design may take into account the expected duration or exposure of the fluid at formation temperature during the expected overall treatment. There would generally be no additional temperature or heating the treatment fluid would see or experience other than original reservoir temperature.

In another non-limiting example, a combination of internal breakers may have synergistic results, that is, the breaking profile of the fluid over time is improved when two types of internal breakers are used rather only one or the other. The use of mineral oil alone, like the use of metal enhanced polyenoic breaker alone, does not give the rate and degree of viscosity reduction over time as does the combination of mineral oil with metal enhanced polyenoic breaker. By using combinations of internal breakers, both the initial and final break of the VES fluid may be customized, that is, have improved overall breaking performance. In other words, one breaker mechanism may help speed up another breaker mechanism. Surprisingly, even with two internal breaker mechanisms present in the VES fluid, the association of the micelles together under the influence of the viscosity enhancer and/or temperature stabilizer may still show excellent fluid loss control.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular breaker used (e.g. mineral, plant, and/or fish oil, unsaturated fatty acid, etc.); the temperature of the fluid; the downhole pressure of the fluid, the starting pH of the fluid; the amounts and types of the viscosity enhancers and the temperature stabilizers, and the complex interaction of these various factors. Nevertheless, in order to give an approximate idea of the proportions of the various breaking components to be used in the methods herein, approximate ranges will be provided. In an alternative, non-limiting embodiment the amount of mineral oil that may be effective herein may range from about 5 to about 25,000 ppm, based on the total amount of the fluid. In another non-restrictive version herein, the amount of mineral oil may range from a lower end of about 50 independently to an upper end of about 12,000 ppm.

The use of transition metal ion sources as breakers for VES-gelled fluids is more fully described in U.S. Ser. No. 11/145,630 filed Jun. 6, 2005, published as U.S. Patent Application Publication 2006/0041028, incorporated by reference herein in its entirety. Briefly, the transition metal ion source used as an internal breaker may include a transition metal salt or transition metal complex, where the transition metal may be from Groups VA, VIA, VIIA, VIIIA, IB, IIB, IIIB, and IVB of the Periodic Table (previous IUPAC American Group notation). One or more chelating agents and/or one or more reducing agent sources may also be used in conjunction with the transition metal ion sources as breaking agents. In one non-limiting embodiment, the amount of transition metal ion from the transition metal ion source ranges from about 0.01 to about 300 ppm, based on the total fluid.

The use of saponified fatty acids as breakers for VES gelled aqueous fluids is more fully described in U.S. Ser. No. 11/372,624 filed Mar. 10, 2006, published as U.S. Patent Application Publication 2006/0211775, incorporated by reference herein in its entirety. Briefly, the saponified fatty acids are soap reaction products of a fatty acid with an alkaline compound selected from the group consisting of organic bases, alkali metal bases, alkaline earth metal bases, ammonium bases, and combinations thereof. The soap reaction products may be pre-formed prior to addition as an internal breaker, or may be formed in situ. Suitable fatty acids include, but are not limited to those found in plant oils and animal oils. Suitable alkali metal bases, alkaline earth metal bases and ammonium bases include, but are not necessarily limited to oxides and hydroxides of cations of the group including Na, K, Cs, Ca, Mg, Ba, Fe, Mn, Cu, Zn, Zr, Mo, V, Co, Al, Sn, $NH_4$, $(CH_3)_4N$, and mixtures thereof. Suitable organic bases include, but are not necessarily limited to, diethanolamine, triethanolamine, choline bases and mixtures thereof. In one non-restrictive embodiment herein, the amount of saponified fatty acid that is effective as a viscosity breaker ranges from about 50 to about 20,000 ppm based on the total viscoelastic surfactant gelled fluid.

The use of the disclosed breaker systems is ideal for controlling viscosity reduction of VES based fluids herein. The breaking systems herein may be particularly useful for breaking the aqueous viscoelastic treating fluids composed of VES. The breaker system may additionally work for foamed fluid applications (hydraulic fracturing, acidizing, and the like), where $N_2$ or $CO_2$ gas is used for the gas phase. The VES breaking methods herein are a significant improvement in that it gives breaking rates for VES based fluids that the industry is accustomed to with conventional polymer based fluids, such as borate cross-linked guar and linear HEC (hydroxyethylcellulose). Potentially more importantly, the use of these internal breaker systems in combination with external downhole breaking conditions should help assure and improve hydrocarbon production compared to prior art that uses only external mechanisms to break the VES fluid for effective and complete VES fluid clean-up after a treatment.

In one non-limiting embodiment, the compositions herein will degrade the gel created by a VES in an aqueous fluid, by disaggregation or rearrangement of the VES micellar structure. However, the inventors do not necessarily want to be limited to any particular mechanism. Also, in another non-restrictive version, the only component present in the VES gelled aqueous fluid that reduces viscosity is one of the internal breakers described herein, or mixtures thereof. Alternatively, a separately introduced external breaker component introduced after the VES-gelled fluid may be used (e.g. various separately added clean-up fluids). However, conditions (such as elevated temperature) and already existing chemicals (reservoir hydrocarbons) may be present when and where the internal breakers are included, either intentionally or incidentally.

The nano-sized stabilizer particles, viscosity enhancer particles and internal breakers herein may be added along with the VES fluids prior to pumping downhole or other application. The VES-gelled aqueous fluids are prepared by blending or mixing a VES into an aqueous fluid. The aqueous base fluid could be, for example, water, brine, aqueous-based foams or water-alcohol mixtures. The brine base fluid may be any brine, conventional or to be developed which serves as a suitable media for the various components. As a matter of convenience, in many cases the brine base fluid may be the brine available at the site used in the completion fluid or other application, e.g. seawater, for a non-limiting example.

More specifically, in one non-limiting embodiment, the brines may be prepared using salts including, but not necessarily limited to, NaCl, KCl, $CaCl_2$, $MgCl_2$, $NH_4Cl$, $CaBr_2$, NaBr, sodium formate, potassium formate, and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples.

The viscoelastic surfactants suitable for use in the fluids herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2 O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include CLEAR-FRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as SURFRAQ™ VES. SURFRAQ is a VES liquid product that is 50% TAPAO and 50% propylene glycol. These viscoelastic surfactants are capable of gelling aqueous solutions to form a gelled base fluid. The additives herein may also be used in DIAMOND FRAQ™ which is a VES system, similar to SURFRAQ, which contains VES breakers sold by Baker Oil Tools.

The amount of VES included in the treating fluid depends on generating, creating or producing enough viscosity to control, inhibit or stop the leak off of the fluid into the high permeability formation. Thus, depending on the fluid, the geometry, pore sizes and other characteristics of the formation, the VES may be added to the aqueous fluid in concentrations ranging from about 0.5 to 12.0% by volume of the total aqueous fluid (5 to 120 gallons per thousand gallons (gptg)). In another non-limiting embodiment, the range for the present aqueous viscoelastic treating fluid may be from about 1.0 independently to about 6.0% by volume VES product. In an alternate, non-restrictive form of the invention, the amount of VES ranges from 2 independently to about 10 volume %.

The proportional makeup of the aqueous viscoelastic treating fluid composition may vary widely depending upon a number of factors including, but not necessarily limited to, the nature of the formation, the formation conditions (e.g. temperature, pressure, permeability, etc.), the particular composition components, the injection method, the interaction of these various factors, and the like. Thus, the proportions of the various components given above are only many of various one non-limiting embodiments that may be suitable herein.

Other optional components may be added, including, but not necessarily limited to, quaternary amines, alkoxylated quaternary amines, and alkoxylated phenols and alcohols (typically ethoxylated phenols and alcohols to help reduce clay swelling and/or reduce surface tension for more even distribution of the components. In another embodiment of the invention, the treatment fluid may contain other viscosifying agents, other different surfactants, clay stabilization additives, scale dissolvers, biopolymer degradation additives, and other common and/or optional components.

The invention will be further illustrated with respect to certain experiments, but these examples are not intended to limit the invention, but only to further describe it in certain specific, non-limiting embodiments.

Example 1

FIG. 1 is a graph of viscosity as a function of shear rate for tests with a 7% KCl brine fluid having 4% by volume (bv) WG-3L VES (AROMOX® APA-T from Akzo Nobel) at 150° F. (66° C.) without a breaker and then with 3.0 GBW-407L gptg fish oil breaker available from Baker Oil Tools, the latter two curves showing approximately 90% broken and 100% broken states. It may thus be seen that fish oil may be an effective and complete internal breaker for use in the aqueous viscoelastic treating fluids herein.

Example 2

Figure 2:
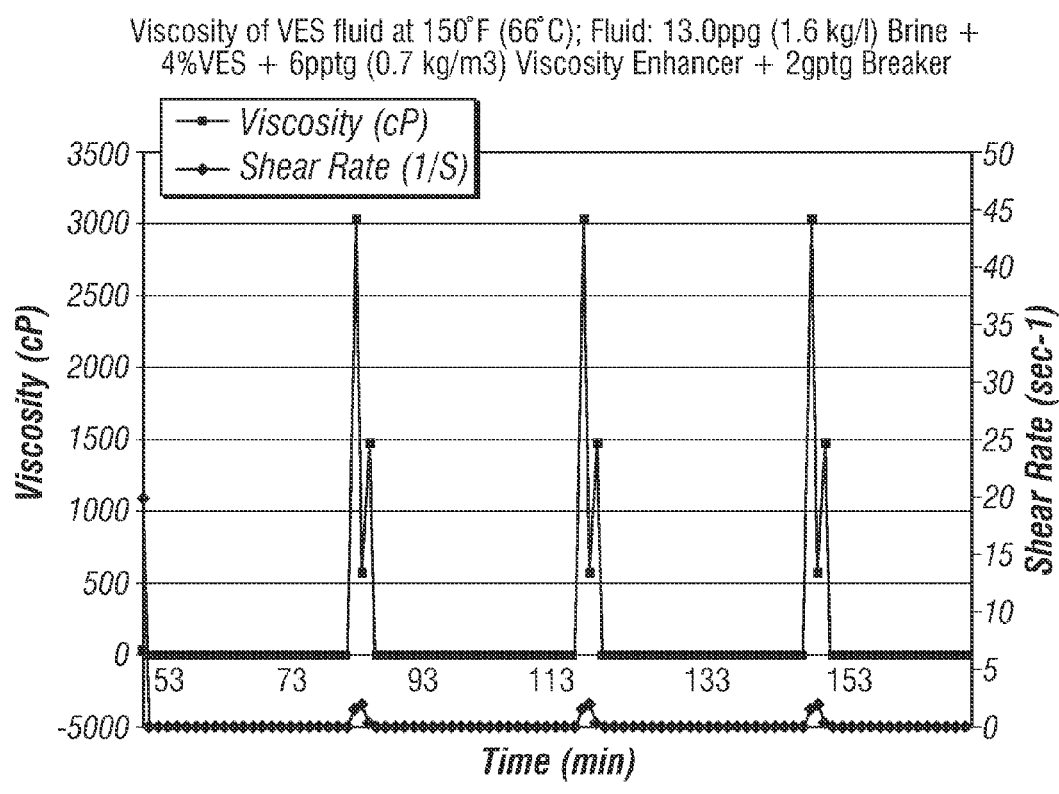
FIG. 2 is a graph of viscosity (left vertical axis) and shear rate (right vertical axis) as a function of time for the indicated fluid at 150° F. (66° C.)

FIG. 2 is a graph of viscosity (left vertical axis) and shear rate (right vertical axis) as a function of time for the indicated fluid at 150° F. (66° C.). This fluid contains 13.0 pounds per gallon (ppg) (1.6 kg/liter) of $CaCl_2/CaBr_2$ brine and 4% by WG-3L VES at 150° F. (66° C.), with 6 pounds per thousand gallons (pptg) (0.7 kg/m$^3$) ZnO viscosity enhancer and 2 gallon per thousand gallon (gptg) (any volume units may be substituted for this value) of fish oil breaker. The FIG. 2 graph demonstrates very high static and low shear rate viscosity of this VES fluid.

Example 3

Figure 3:
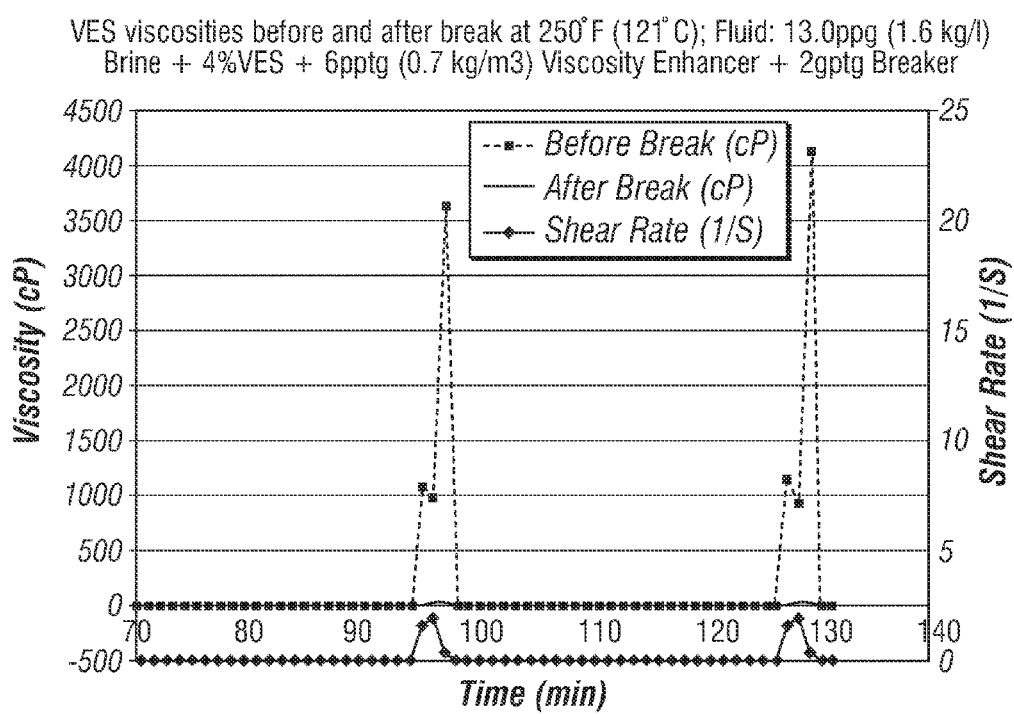
FIG. 3 is a graph of viscosity both before and after the viscosity break (left vertical axis), and shear rate (right vertical axis) as a function of time for the indicated fluid at 250° F. (121° C.)

FIG. 3 is a graph of viscosity both before and after the viscosity break (left vertical axis), and shear rate (right vertical axis) as a function of time for the same fluid of Example 2 at 250° F. (121° C.). This lab test demonstrated very high static and low shear rate viscosity of the VES fluid before being broken and very low viscosity after being broken.

Example 4

FIG. 4 is a graph of flowback pressure as a function of time for VES clean-up procedures in 1 inch×6 inch (2.5×15 cm) Berea cores without a viscosity enhancer, for a 3% KCl fluid with 4% VES with and without 3.0 gptg GBW-407L internal fish oil breaker. The partially broken curve is from using 3.0 gptg GBW-407L fish oil shut in core at 150° F. (66° C.) for 4 hours to simulate a partial VES break and the completely broken curve is from using 3.0 gptg fish oil shut in core at 150° F. (66° C.) for 12 hours to simulate a complete VES break. This Example further demonstrates the effectiveness of the internal breakers herein. All viscosity tests were performed on a Grace rheometer at 250° F. (121° C.) with 300 psi (2.1 MPa) pressure and 100 sec$^{-1}$ shear.

Example 5

FIG. 5 is a graph of viscosity as a function of very low shear rate for a fluid with and without a viscosity enhancer. The fluid is 13.0 ppg (1.6 kg/liter) $CaCl_2/CaBr_2$ brine with 4% VES with and without 0.077% bw viscosity enhancer 30 nm ZnO. The viscosity of the fluid with viscosity enhancer is about ten times higher than that without at 0.01 sec$^{-1}$ shear rate.

Example 6

Twelve inch long (30 cm) Berea core leakoff (fluid loss) tests with VES fluids showed that the second spurt loss is much lower than that of the first spurt loss as shown in Table I. This means that the pre-saturation VES fluids may significantly reduce fluid loss for the fluids used for completion or stimulation fluids as described herein. Spurt loss means the fluid loss volume at first half minute in a leakoff test. Note that in the fluids reported in Table I no fluid loss agent was used. The data listed as 1$^{st}$ was the first fluid injection. The data listed as 2$^{nd}$ was the second fluid injected, thus simulating two mini-fracs.

TABLE I

Fluid Loss Tests with 12 inch (30 cm) Long Berea Cores

| Temp. ° F. (° C.) | WG-3L % bv | Brine | 1$^{st}$ Spurt Loss (30 sec) gal/ft$^2$ (m$^3$/m$^2$) | 2$^{nd}$ Spurt Loss (30 sec) gal/ft$^2$ (m$^3$/m$^2$) |
|---|---|---|---|---|
| 150 (66) | 3 | 3% bw KCl | 0.29 (7.1) | 0.066 (1.6) |
| 150 (66) | 4 | 3% bw KCl | 0.511 (12.5) | 0.027 (0.66) |
| 200 (93) | 3 | 3% bw KCl | 0.362 (8.9) | 0.067 (1.6) |
| 200 (93) | 4 | 10.8 ppg (1.3 kg/l) $CaCl_2$ | 0.043 (1.1) | 0.001 (0.02) |

Chemical compositions and methods are thus provided for pre-saturating the near wellbore region of a subterranean formation to prevent or inhibit fluid leakoff. In the foregoing specification, the invention has been described with reference to specific embodiments thereof, and has been demonstrated as effective in providing a method for inhibiting and/or preventing fluid leakoff in subterranean formations. However, it will be evident that various modifications and changes can be made to the inventive compositions and methods without departing from the broader spirit or scope of the invention as set forth in the appended claims. Accordingly, the specification is to be regarded in an illustrative rather than a restrictive sense. For example, specific combinations of VESs, temperature stabilizers, viscosity enhancers, internal breakers and other components falling within the claimed parameters, but not specifically identified or tried in a particular composition or under specific conditions, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method for pre-saturating a high permeability subterranean formation comprising:
    injecting into a wellbore in a subterranean formation having a permeability of at least 100 millidarcies (md) (10$^{-9}$ cm$^2$) an aqueous viscoelastic treating fluid comprising:
        brine,
        at least one viscoelastic surfactant in an amount effective to increase the viscosity of the aqueous viscoelastic treating fluid,
        at least one viscosity enhancer,
        at least one temperature stabilizer, and
        at least one internal breaker; and
    pumping the aqueous viscoelastic treating fluid against the high permeability subterranean formation;
    stop pumping the aqueous viscoelastic treating fluid against the high permeability subterranean formation to permit the aqueous viscoelastic treating fluid to be at least partially absorbed into pores of the high permeability subterranean formation for a time interval ranging from about 5 to about 30 minutes; and injecting a second treating fluid into the wellbore for a treatment operation, in the absence of acetic acid, formic acid, hydrochloric acid, hydrofluoric acid.

2. The method of claim 1 where the temperature stabilizer is selected from the group consisting of alkaline earth metal oxides, alkaline earth metal hydroxides, alkali metal oxides, alkali metal hydroxides, $Al_2O_3$, ZnO, $TiO_2$, MgO and mixtures thereof.

3. The method of claim 2 where the temperature stabilizer is present in an amount of ranging from about 0.5 to about 40.0 pptg (about 0.06 to about 4.8 kg/1000 liters) based on aqueous viscoelastic treating fluid.

4. The method of claim 2 where in the temperature stabilizer, the alkaline earth metal is selected from the group consisting of magnesium, calcium, strontium, barium and mixtures thereof, and the alkali metal is selected from the group consisting of lithium, sodium, potassium and mixtures thereof.

5. The method of claim 2 where the temperature stabilizer is selected from the group consisting of MgO, $TiO_2$, $Al_2O_3$, and mixtures thereof.

6. The method of claim 1 where the viscosity enhancer is selected from the group consisting of pyroelectric particles, piezoelectric particles, and mixtures thereof.

7. The method of claim 6 where the viscosity enhancer is selected from the group consisting of ZnO, silica, berlinite ($AlPO_4$), lithium tantalate ($LiTaO_3$), gallium orthophosphate ($GaPO_4$), $BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$, potassium sodium tartrate, tourmaline, topaz and mixtures thereof.

8. The method of claim 1 where the viscosity enhancer is present in an amount ranging from about 0.1 to about 500 pptg (about 0.012 to about 60 kg/m$^3$) based on the total aqueous viscoelastic treating fluid.

9. The method of claim 1 where the mean particle sizes of the viscosity enhancers and the temperature stabilizers is less than about 1000 nanometers.

10. The method of claim 1 where the internal breaker is selected from the group consisting of transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof, and where the amount of internal breaker is effective to eventually reduce the viscosity of the aqueous viscoelastic treating fluid.

11. The method of claim 1 where the treatment operation is selected from the group consisting of fracturing, gravel packing, frac-packing, and combinations thereof.

12. A method for pre-saturating a high permeability subterranean formation comprising:

injecting into a wellbore in a subterranean formation having a permeability of at least 100 millidarcies (md) ($10^{-9}$ cm$^2$) an aqueous viscoelastic treating fluid comprising: brine, at least one viscoelastic surfactant in an amount effective to increase the viscosity of the aqueous viscoelastic treating fluid, from about 0.1 to about 500 pptg (about 0.012 to about 60 kg/m$^3$) based on the total aqueous viscoelastic treating fluid of at least one viscosity enhancer selected from the group consisting of pyroelectric particles, piezoelectric particles, and mixtures thereof;

from about 0.5 to about 40.0 pptg (about 0.06 to about 4.8 kg/1000 liters) based on aqueous viscoelastic treating fluid of at least one temperature stabilizer selected from the group consisting of alkaline earth metal oxides, alkaline earth metal hydroxides, alkali metal oxides, alkali metal hydroxides, $Al_2O_3$, ZnO, $TiO_2$, MgO and mixtures thereof, and at least one internal breaker; and pumping the aqueous viscoelastic treating fluid against the high permeability subterranean formation;

stop pumping the aqueous viscoelastic treating fluid against the high permeability subterranean formation to permit the aqueous viscoelastic treating fluid to be at least partially absorbed into pores of the high permeability subterranean formation for a time interval that pumping is stopped before injecting a second treating fluid ranging from about 5 to about 30 minutes; and injecting the second treating fluid into the wellbore for a treatment operation, in the absence of acetic acid, formic acid, hydrochloric acid, hydrofluoric acid.

13. The method of claim 12 where in the temperature stabilizer, the alkaline earth metal is selected from the group consisting of magnesium, calcium, strontium, barium and mixtures thereof, and the alkali metal is selected from the group consisting of lithium, sodium, potassium and mixtures thereof.

14. The method of claim 13 where the temperature stabilizer is selected from the group consisting of MgO, $TiO_2$, $Al_2O_3$, and mixtures thereof.

15. The method of claim 12 where the mean particle sizes of the viscosity enhancers and the temperature stabilizers is less than about 1000 nanometers.

16. The method of claim 12 where the internal breaker is selected from the group consisting of transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof, and where the amount of internal breaker is effective to eventually reduce the viscosity of the aqueous viscoelastic treating fluid.

17. The method of claim 12 where the treatment operation is selected from the group consisting of fracturing, gravel packing, frac-packing, and combinations thereof.

18. A method for pre-saturating a high permeability subterranean formation comprising:

injecting into a wellbore in a subterranean formation having a permeability of at least 100 millidarcies (md) ($10^{-9}$ cm$^2$) an aqueous viscoelastic treating fluid comprising: brine, at least one viscoelastic surfactant in an amount effective to increase the viscosity of the aqueous viscoelastic treating fluid, from about 0.1 to about 500 pptg (about 0.012 to about 60 kg/m$^3$) based on the total aqueous viscoelastic treating fluid of at least one viscosity enhancer selected from the group consisting of ZnO, silica, berlinite ($AlPO_4$), lithium tantalate ($LiTaO_3$), gallium orthophosphate ($GaPO_4$), $BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$, potassium sodium tartrate, tourmaline, topaz and mixtures thereof;

from about 0.5 to about 40.0 pptg (about 0.06 to about 4.8 kg/1000 liters) based on aqueous viscoelastic treating fluid of at least one temperature stabilizer selected from the group consisting of alkaline earth metal oxides, alkaline earth metal hydroxides, alkali metal oxides, alkali metal hydroxides, $Al_2O_3$, ZnO, $TiO_2$, MgO and mixtures thereof, and at least one internal breaker selected from the group consisting of transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof where the amount of internal breaker is effective to eventually reduce the viscosity of the aqueous viscoelastic treating fluid; and pumping the aqueous viscoelastic treating fluid against the high permeability subterranean formation;

stop pumping the aqueous viscoelastic treating fluid against the high permeability subterranean formation to permit the aqueous viscoelastic treating fluid to be at least partially absorbed into pores of the high permeability subterranean formation for a time interval ranging from about 5 to about 30 minutes; and injecting a second treating fluid into the wellbore for a treatment operation selected from the group consisting of fracturing, gravel packing, frac-packing, and combinations thereof, in the absence of acetic acid, formic acid, hydrochloric acid, hydrofluoric acid.

19. The method of claim 18 where in the temperature stabilizer, the alkaline earth metal is selected from the group consisting of magnesium, calcium, strontium, barium and mixtures thereof, and the alkali metal is selected from the group consisting of lithium, sodium, potassium and mixtures thereof.

20. The method of claim 19 where the temperature stabilizer is selected from the group consisting of MgO, $TiO_2$, $Al_2O_3$, and mixtures thereof.

21. The method of claim 18 where the mean particle sizes of the viscosity enhancers and the temperature stabilizers is less than about 1000 nanometers.

\* \* \* \* \*